(12) United States Patent
Shibamoto et al.

(10) Patent No.: US 6,619,062 B1
(45) Date of Patent: Sep. 16, 2003

(54) SCROLL COMPRESSOR AND AIR CONDITIONER

(75) Inventors: Yoshitaka Shibamoto, Sakai (JP); Kenji Matsuba, Sakai (JP); Keiji Yoshimura, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 115 days.

(21) Appl. No.: 09/890,882

(22) PCT Filed: Oct. 4, 2000

(86) PCT No.: PCT/JP00/06930

§ 371 (c)(1),
(2), (4) Date: Aug. 6, 2001

(87) PCT Pub. No.: WO01/42660

PCT Pub. Date: Jun. 14, 2001

(30) Foreign Application Priority Data

Dec. 6, 1999 (JP) .......................................... 11-345955

(51) Int. Cl.[7] ................................................ F25B 49/02
(52) U.S. Cl. .................. 62/228.3; 62/196.1; 62/228.4; 62/228.5
(58) Field of Search ............................ 62/228.1, 228.3, 62/228.4, 228.5, 196.1, 196.2, 196.3, 505

(56) References Cited

U.S. PATENT DOCUMENTS 4,989,414 A * 2/1991 Murayama et al. ........ 62/228.4
6,058,729 A * 5/2000 Lifson et al. ............ 62/196.1 X
6,202,438 B1 * 3/2001 Barito ....................... 62/505 X
6,213,731 B1 * 4/2001 Doepker et al. ........ 62/228.5 X

FOREIGN PATENT DOCUMENTS

| JP | 57-086588 | 5/1982 |
|---|---|---|
| JP | 02191882 | 7/1990 |
| JP | 04-334784 | 11/1992 |
| JP | 06159270 | 6/1994 |
| JP | 2824476 | 9/1998 |
| JP | 11-182479 | 7/1999 |

* cited by examiner

Primary Examiner—Harry B. Tanner
(74) Attorney, Agent, or Firm—Burns, Doane, Swecker & Mathis, LLP

(57) ABSTRACT

A scroll compressor comprises an operating state detection part (27) detecting an operating state, a variable-speed motor (28), a control part (26) and an unloading mechanism (12) serving as capacity control means. The control part (26) controls operation of the unloading mechanism (12) and the rotational frequency of the motor (28) in response to the operating state detected by the operating state detection part (27). An air conditioner comprises the aforementioned scroll compressor, a condenser (23), an expansion valve (24) and an evaporator (25).

10 Claims, 14 Drawing Sheets

SCROLL COMPRESSOR AND AIR CONDITIONER

TECHNICAL FIELD

The present invention relates to a scroll compressor and an air conditioner, and more specifically, it relates to a scroll compressor and an air conditioner capable of controlling switching between unloaded operation and full-loaded operation, controlling the capacity of refrigerant injection and controlling the rotational frequency of a motor on the basis of a result of detection of the operating state.

BACKGROUND ART

FIG. 17 shows an exemplary conventional refrigerant compressor. This compressor is disclosed in Japanese Patent Laying-Open No. 11-182479 (1999).

As shown in FIG. 17, the refrigerant compressor comprises a closed container 63 having a fixed scroll 56 and a rocking scroll (not shown) built therein. A cylinder 53 is formed on an end of the closed container 63. A piston control valve 51 and a compression spring 52 are set in the cylinder 53.

The cylinder 53 is further provided with a first passage 60 communicating with an intermediate pressure space 59, a second passage 61 communicating with a suction pressure space 57 and a third passage 62 communicating with a discharge pressure space 58 through a discharge port 55. A back pressure space 54 of the piston control valve 51 communicates with the third passage 62.

In the compressor having the aforementioned structure, the piston control valve 51 moves in response to the difference between a suction pressure (Ps) and a discharge pressure (Pd) for a refrigerant to open/close the first passage 60. Thus, the operating state of the compressor is switched between operation (full-loaded operation) closing the first passage 60 for attaining discharge capacity of 100% and operation (unloaded operation) opening the first passage 60 for reducing the discharge capacity.

The aforementioned compressor, automatically controlling switching between unloaded operation and full-loaded operation in response to the pressure condition in the compressor, has the following problem. This problem is now described with reference to FIG. 18. FIG. 18 illustrates the relation between a condensing temperature (Tc), an evaporating temperature (Te) and an operating pressure ratio (Pr).

When the evaporating temperature (Te) is low and the condensing temperature (Tc) is high (the region shown by slanting lines in FIG. 18) while required refrigerating ability is small in a refrigerating cycle, for example, the aforementioned compressor is not subjected to unloaded operation. This is because the suction pressure (Ps) for the refrigerant is reduced and the discharge pressure (Pd) is increased when the evaporating temperature (Te) is low and the condensing temperature (Tc) is high, to close the aforementioned first passage 60.

When not subjected to unloaded operation but operated with small ability as described above, the compressor must unavoidably be operated at a low pressure with difficulty in lubrication. In such low-speed operation, further, motor efficiency is lower than that in intermediate- or high-speed operation, and efficiency may be reduced due to leakage of compression gas in the compressor or the like.

As hereinabove described, the conventional compressor automatically controls switching between unloaded operation and full-loaded operation without detecting the operating state. Therefore, the compressor cannot sometimes be properly and efficiently operated in response to the operating state. This problem can also arise in an air conditioner comprising the aforementioned compressor.

DISCLOSURE OF INVENTION

The present invention has been proposed in order to solve the aforementioned problem. An object of the present invention is to provide a scroll compressor and an air conditioner capable of selecting proper and efficient operation in response to every operating state.

A scroll compressor according to the present invention has a movable scroll (2) and a fixed scroll (1) forming a compression chamber (40) compressing a refrigerant, and comprises a variable-speed motor (28), capacity control means (12, 35), an operating state detection part (27) and a control part (26). The variable-speed motor (28) drives the movable scroll (2). The capacity control means (12, 35) controls the capacity of the scroll compressor by supplying the refrigerant into the compression chamber (40) or bypassing the refrigerant from the compression chamber (40) to a low-pressure side. The operating state detection part (27) detects the operating state of the scroll compressor. The control part (26) controls operation of the capacity control means (12, 35) and the rotational frequency of the motor (28) in response to the operating state detected by the operating state detection part (27).

The scroll compressor comprises the aforementioned operating state detection part (27), so that the operating state of the scroll compressor can be detected. Further, the scroll compressor comprises the aforementioned control part (26), so that the operation of the capacity control means (12, 35) and the rotational frequency of the motor (28) can be controlled in response to the operating state of the scroll compressor. Thus, proper and efficient operation can be selected under every operating condition. The aforementioned operating state detection part (27) and control part (26) may be set not only in the compressor but also in a refrigerating/air conditioner system.

In the scroll compressor according to the present invention, the operating state detection part (27) preferably includes an operating pressure ratio detection part detecting an operating pressure ratio indicating the value of the ratio of a suction pressure for the refrigerant to a discharge pressure for the refrigerant and a required ability detection part detecting required ability in operation of the scroll compressor, and the control part (26) preferably controls the operation of the capacity control means (12, 35) and the rotational frequency of the motor (28) in response to the aforementioned operating pressure ratio and required ability.

The operating state detection part (27) has the operating pressure detection part and the required ability detection part as hereinabove described, whereby the operating state of the scroll compressor such as the operating pressure ratio or the required ability can be detected. The control part (26) controls the operation of the capacity control means (12, 35) and the rotational frequency of the motor (28) in response to the operating pressure ratio and the required ability detected in the aforementioned manner, so that the scroll compressor can be operated in high efficiency under every operating condition.

In the scroll compressor according to the present invention, the capacity control means (12, 35) preferably includes unloading means (12) for substantially delaying a compression starting point in the compression chamber (40) and performing unloaded operation.

The capacity control means (12, 35) can be exemplified by the unloading means (12). When the scroll compressor comprises the unloading means (12), the unloading means (12) can be intentionally operated in response to the operating state of the scroll compressor for performing unloaded operation. More specifically, the unloading means (12) can be intentionally operated for performing unloaded operation under conditions of a low evaporating temperature, a high condensing temperature and small required refrigerating ability, for example. Thus, it is possible to avoid the general problem of low-speed operation with difficulty in lubrication.

In the scroll compressor according to the present invention, the capacity control means (12, 35) includes refrigerant injection means (35) for injecting the refrigerant into the compression chamber (40).

The capacity control means (12, 35) can alternatively be exemplified by the refrigerant injection means (35). When the scroll compressor comprises the refrigerant injection means (35), the injection means (35) can be properly operated in response to the operating state of the scroll compressor and the capacity of the scroll compressor can be increased. Thus, the variable ability width of the scroll compressor can be increased. When employing the refrigerant injection means (35) along with the aforementioned unloading means (12), the control part (26) can control the operation of the unloading means (12) not to unnecessarily operate during injection of the refrigerant. Thus, it is possible to avoid such a situation that the injected refrigerant leaks into a suction pressure chamber and the quantity of circulation of the refrigerant cannot be sufficiently increased.

The scroll compressor according to the present invention preferably further comprises a discharge port (19) discharging the compressed refrigerant and a discharge valve (20) for opening/closing the discharge port (19) and preventing the refrigerant from counterflow.

In unloaded operation, the scroll compressor is generally operated at a low speed. Therefore, discharge resistance of the refrigerant is so reduced that the refrigerant may flow backward in the discharge port (19). Such counterflow of the refrigerant can be prevented and counterflow loss can be reduced by providing the discharge valve (20) in the aforementioned manner. Thus, efficiency in low-speed operation can be improved.

The scroll compressor according to the present invention preferably further comprises a relief port (29) communicating with the compression chamber (40) reaching the discharge pressure and a relief valve (31a) opening/closing the relief port (29).

The scroll compressor is operated at a high speed in an unloaded state under conditions of a high evaporating temperature, a low condensing temperature and large required refrigerating ability, for example. When the scroll compressor is operated at a high speed, however, the flow rate of discharge gas may be increased to increase overcompression loss. The refrigerant reaching the discharge pressure can-be properly discharged to a high-pressure space by providing the relief port (29) and the relief valve (31a) as described above. Thus, over-compression loss can be reduced and operating efficiency can be improved.

In the scroll compressor according to the present invention, the movable scroll (2) and the fixed scroll (1) preferably have spiral bodies (41, 42), and the tail end of one of the spiral bodies (41) preferably extends toward a portion close to the tail end of the other spiral body (42).

When the scroll compressor has the so-called asymmetrical spiral bodies as described above, unloading ports can be intensively provided on one portion as elements forming an unloading mechanism and injection ports can also be intensively provided on one portion as elements of a refrigerant injection mechanism.

The scroll compressor according to the present invention preferably comprises a suction pressure space (33) on the back surface of the fixed scroll (1).

When the suction pressure space (33) is provided on the back surface of the fixed scroll (2) as described above, no detour may be provided for releasing the refrigerant to a low-pressure space in unloaded operation but the unloading mechanism can be simplified.

An air conditioner according to the present invention comprises the aforementioned scroll compressor. Throughout the specification, the air conditioner is defined as including not only a cooling/heating system but also a refrigerator.

When the air conditioner comprises the scroll compressor having the aforementioned structure, high-efficiency operation is enabled in every operating state.

The air conditioner according to the present invention is preferably the so-called multiple air conditioner including a compressor (37) having a compression element compressing a refrigerant and a plurality of loading-side heat exchangers (25a, 25b, 25c) condensing or evaporating the refrigerant, and comprises a variable-speed motor, capacity control means (12a), an operating state detection part (39) and a control part (38). The variable-speed motor drives the compression element. The capacity control means (12a) supplies the refrigerant to the compression element or extracts the refrigerant from the compression element thereby controlling the capacity of the compressor. The operating state detection part (39) detects the operating state of the air conditioner. The control part (38) controls the operation of the capacity control means (12a) and the rotational frequency of the motor in response to the operating state detected by the operating state detection part (39). The aforementioned loading-side heat exchanger can be exemplified by an indoor unit (evaporator or condenser) of an air conditioner, for example.

When the air conditioner comprises the operating state detection part (39) as described above, the operating state of the air conditioner can be detected. The control part (38) can control the operation of the capacity control means (12a) and the rotational frequency of the motor on the basis of the result of the detected operating state. Thus, when the difference between an evaporating temperature and a condensing temperature is so small that high ability is necessary, for example, the control part (38) can operate the capacity control means (12a) for performing unloaded operation and rotating the motor at a high speed, thereby reducing overcompression loss. When the difference between the evaporating temperature and the condensing temperature is large and the ability may be small, the control part (38) can perform full-loaded operation without operating the capacity control means (12a) and rotate the motor at a low speed, thereby reducing counterflow loss (under-compression). Consequently, high-efficiency operation can be performed under every operating condition. In heating operation with a low outside air temperature and a low evaporating temperature, for example, the control part (38) can operate the capacity control means (12a) for injecting a gas refrigerant and rotate the motor at a high speed, thereby increasing the quantity of discharged refrigerant without extremely increasing the rotational frequency of the motor. In this case, reliability of the compressor can be improved. When adiabatic efficiency of the compressor is reduced and the temperature of the discharged refrigerant is increased in low-speed operation of the compressor, the control part (38) can operate the capacity control means (12a) for injecting a liquid refrigerant, thereby reducing the temperature of the discharged refrigerant. Thus, not only reduction of the life of the refrigerant or lubricating oil can be suppressed but also operation of the air conditioner may not be stopped due to an increased temperature of the discharged refrigerant.

In the air conditioner according to the present invention, the operating state detection part (39) preferably includes an operating pressure ratio detection part detecting an operating pressure ratio indicating the value of the ratio of a suction pressure for the refrigerant to a discharge pressure for the refrigerant in the aforementioned compressor and a required ability detection part detecting required ability of the loading-side heat exchangers (25a, 25b, 25c) in operation of the air conditioner, and the control part (38) preferably controls the operation of the capacity control means (12a) and the rotational frequency of the motor in response to the aforementioned operating pressure ratio and required ability.

Thus, high-efficiency operation can be performed as described above by detecting the operating state such as the operating pressure ratio or the required ability and controlling the operation of the capacity control means (12a) and the rotational frequency of the motor on the basis of the operating state.

In the air conditioner according to the present invention, the operating state detection part (39) includes a number detection part detecting the number of operated loading-side heat exchangers (25a, 25b, 25c), for controlling the operation of the capacity control means (12a) and the rotational frequency of the motor also in consideration of the number of the operated loading-side heat exchangers.

In the multiple air conditioner, the number of the operated loading-side heat exchangers (25a, 25b, 25c) also influences the required ability in addition to the relation between the evaporating temperature and the condensing temperature. When the aforementioned number detection part is provided, therefore, the operation of the capacity control means (12a) and the rotational frequency of the motor can be controlled also in consideration of the number of the operated loading-side heat exchangers. Thus, high-efficiency operation can be performed also when the temperature difference between the evaporating temperature and the condensing temperature is small and all loading-side heat exchangers (25a, 25b, 25c) are operated or the temperature difference is large and the loading-side heat exchangers are partially operated.

The foregoing and other objects, features, aspects and advantages of the present invention will become more apparent from the following detailed description of the present invention when taken in conjunction with the accompanying drawings.

BEST MODE FOR CARRYING OUT THE INVENTION

Figure 1:
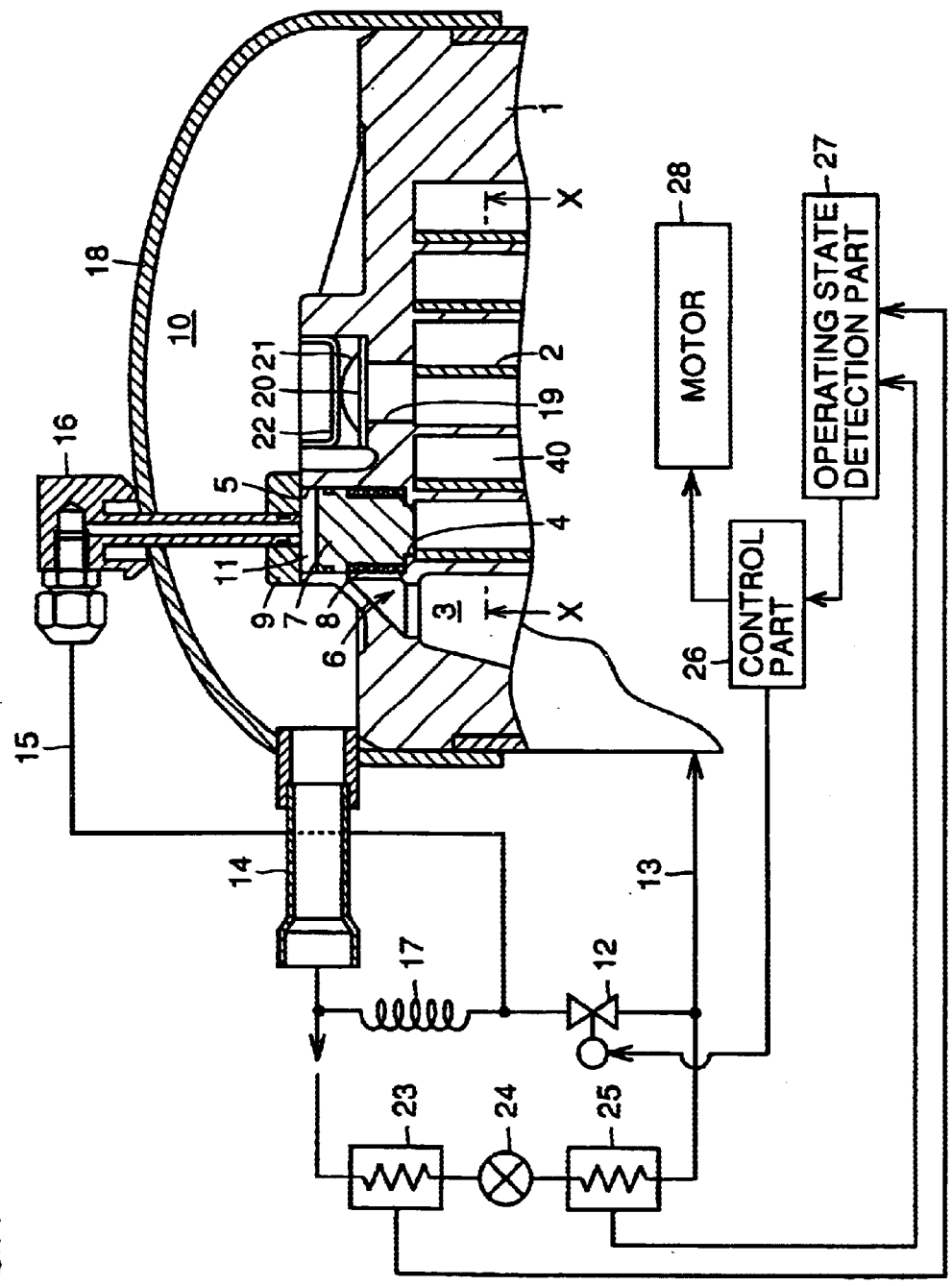
FIG. 1 is a schematic block diagram of a scroll compressor according to the present invention illustrated with a refrigerating cycle.

Embodiments of the present invention are now described with reference to FIGS. 1 to 16. FIG. 1 is a schematic block diagram of a scroll compressor according to an embodiment of the present invention.

As shown in FIG. 1, the scroll compressor according to the present invention comprises a casing 18, a fixed scroll 1, a movable scroll 2, an unloading mechanism, a discharge pipe (high-pressure line) 14, a control part 26, an operating state detection part 27 and a motor 28.

The fixed scroll 1, the movable scroll 2 and the motor 28 are built in the casing 18. The fixed scroll 1 has a discharge port 19 discharging a refrigerant, an unloading port 4 opened in unloaded operation, a valve hole 5, a bypass path 6, a bypass valve 7, a coil spring 8, a lid member 9, an a operating pressure chamber 11, a discharge valve 20, a valve spring 21 and a valve guard 22.

The bypass path 6 makes a low-pressure space 3 storing an uncompressed refrigerant communicate with a compression chamber 40 and extracts the refrigerant from the compression chamber 40 into the low-pressure space 3 in unloaded operation, for substantially delaying a compression starting point for the refrigerant. The bypass valve 7 is set in the operating pressure chamber 11 for opening/closing the unloading port 4.

The lid member 9 closes an opening of the valve hole 5. The lid member 9 receives a joint pipe 16 therethrough. The discharge valve 20, opening/closing the discharge port 19, opens to discharge the refrigerant reaching a discharge pressure into a discharge dome 10.

The motor 28 drives the movable scroll 2 through a crank shaft (not shown). The compression chamber 40 is formed between the movable scroll 2 and the fixed scroll 1, for compressing the refrigerant therein.

The unloading mechanism includes the unloading port 4, the valve hole 5, the bypass path 6, the bypass valve 7, the coil spring 8, the lid member 9, the operating pressure chamber 11, an unloaded operation valve 12, an operating pressure line 15, the joint pipe 16 and a capillary tube 17. The scroll compressor can be subjected to unloaded operation by opening the unloaded operation valve 12 and operating the unloading mechanism.

The discharge pipe (high-pressure line) 14 discharges the refrigerant of a high pressure discharged into the discharge dome 10 from the casing 18. The discharged refrigerant passes through a low-pressure line 13 through a condenser 23, an expansion valve 24 and an evaporator 25, for example, to be fed into the scroll compressor again.

The operating state detection part 27 detects the operating state of the scroll compressor. More specifically, the operating state detection part 27 has an operating pressure ratio detection part and a required ability detection part and detects an operating pressure ratio Pr of the scroll compressor and required ability in operation of the scroll compressor.

The operating pressure ratio Pr is the ratio (Pd/Ps) of a suction pressure Ps for the refrigerant to a discharge pressure Pd for the refrigerant. The discharge pressure Pd can be substantially replaced with a condensing pressure Pc in a refrigerant condensing process while the suction pressure Ps can be substantially replaced with an evaporating pressure Pe in a refrigerant evaporating process, and hence the operating pressure ratio Pr can be calculated by detecting the pressures Pc and Pe. The pressures Pc and Pe are obtained on the basis of a condensing temperature Tc and an evaporating temperature Te, for example.

When an apparatus comprising the scroll compressor is an air conditioner, for example, the required ability of the scroll compressor can be detected on the basis of temperature conditions such as a suction air temperature of an indoor unit, an indoor set temperature, indoor humidity and the outside air temperature.

The rotational frequency of the motor 28, which is a variable-speed motor driven by an inverter, can be increased/decreased at need.

The control part 26 controls operation of the unloading mechanism and the rotational frequency of the motor 28 on the basis of the result of detection by the operating state detection part 27. More specifically, the control part 26 opens the unloaded operation valve 12 for performing unloaded operation when determining that unloaded operation is proper, and increases/decreases the rotational frequency of the motor 28 when further capacity control is necessary in this operating state.

Figure 2:
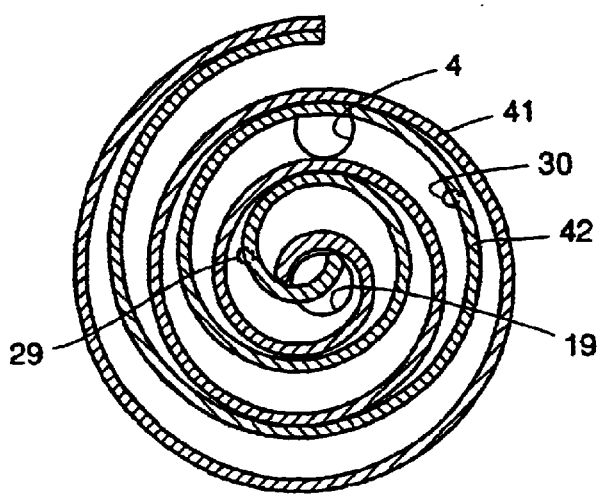
FIG. 2 is a sectional view taken along the line X—X in FIG. 1.

FIG. 2 shows a sectional structure taken along the line X—X in FIG. 1. As shown in FIG. 2, the fixed scroll 1 and the movable scroll 2 have spiral bodies 41 and 42 respectively, so that a plurality of compression chambers 40 are formed between the spiral bodies 41 and 42. Referring to FIG. 2, the spiral bodies 41 and 42 are asymmetrical and the tail end of the spiral body 41 is located in the vicinity of the tail end of the spiral body 42.

The fixed scroll 1 is provided with an injection port 30 and a relief port 29 in addition to the aforementioned discharge port 19 and unloading port 4, as shown in FIG. 2.

The injection port 30, employed for injecting a gas refrigerant or a liquid refrigerant into the compression chambers 40, can increase the capacity of the scroll compressor by injecting the gas refrigerant and reduce the temperature of the discharged refrigerant by injecting the liquid refrigerant.

The scroll compressor has the so-called asymmetrical spiral bodies 41 and 42 as described above, whereby the unloading port 4 and the injection port 30 can be intensively provided on one portion. In other words, two compression chambers 40 starting compression with deviation of about 180° C. can successively communicate with the ports 4 and 30 by simply providing these ports 4 and 30 on one portion.

Figure 3:
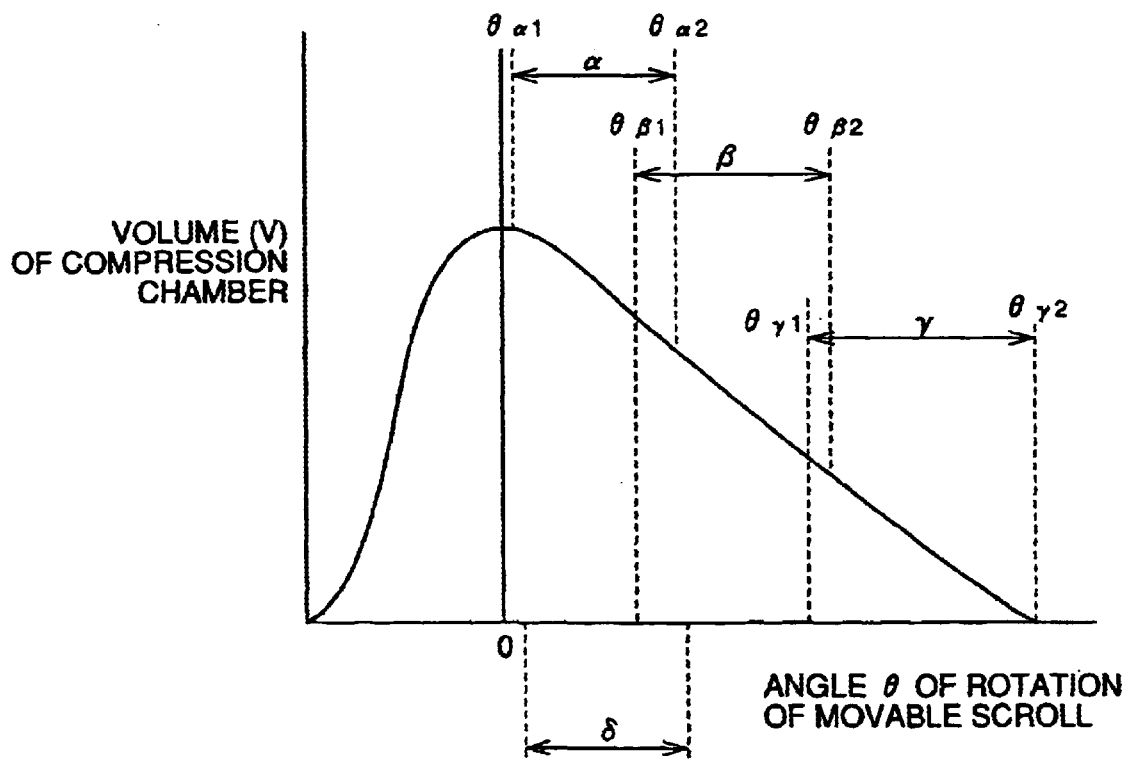
FIG. 3 illustrates exemplary opening angle ranges of an unloading port, a relief port, an injection port and a discharge port.

FIG. 3 illustrates communication angle ranges of the unloading port 4, the discharge port 19, the relief port 29 and the injection port 30 with reference to the communication chambers 40. Referring to FIG. 3, α denotes the communication angle range of the unloading port 4, β denotes the communication angle range of the relief port 29, γ denotes the communication angle range of the discharge port 19, and δ denotes the communication angle range of the injection port 30.

Characteristic operation of the scroll compressor having the aforementioned structure is now described.

First, the operating state detection part 27 detects the operating state of the scroll compressor. More specifically, the operating pressure ratio detection part of the operating state detection part 27 detects the operating pressure ratio Pr, and the required ability detection part of the operating state detection part 27 detects the required ability of the scroll compressor.

In order to detect the operating pressure ratio Pr, the operating state detection part 27 detects the condensing temperature Tc and the evaporating temperature Te with a temperature sensor or the like and obtains the condensing pressure Pc and the evaporating pressure Pe on the basis of these values. Then the operating state detection part 27 calculates the operating pressure ratio Pr from these pressure values.

Figure 4:
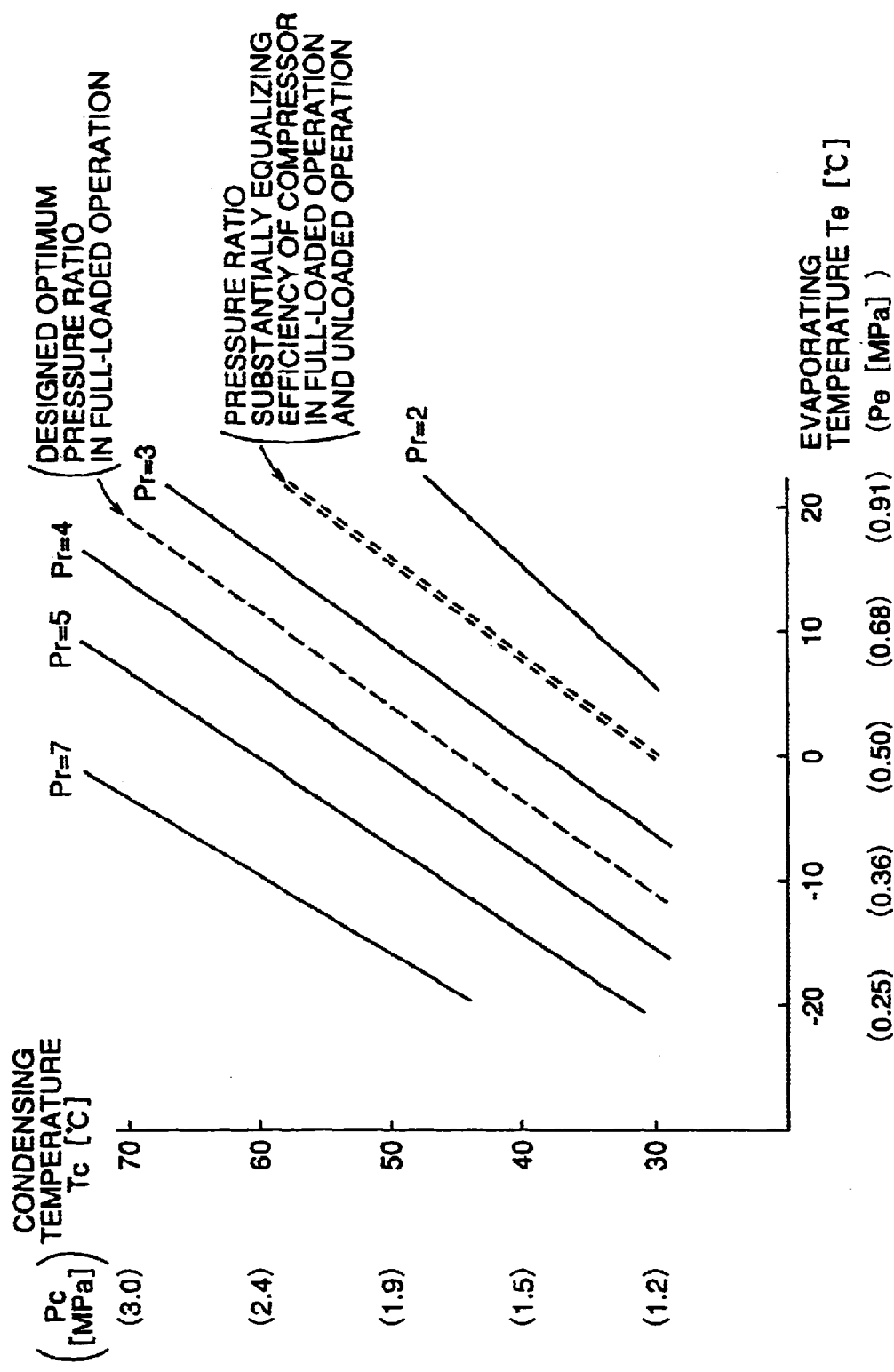
FIG. 4 illustrates the relation between operating temperature conditions (condensing temperature and evaporating temperature) and an operating pressure ratio.
Figure 5:
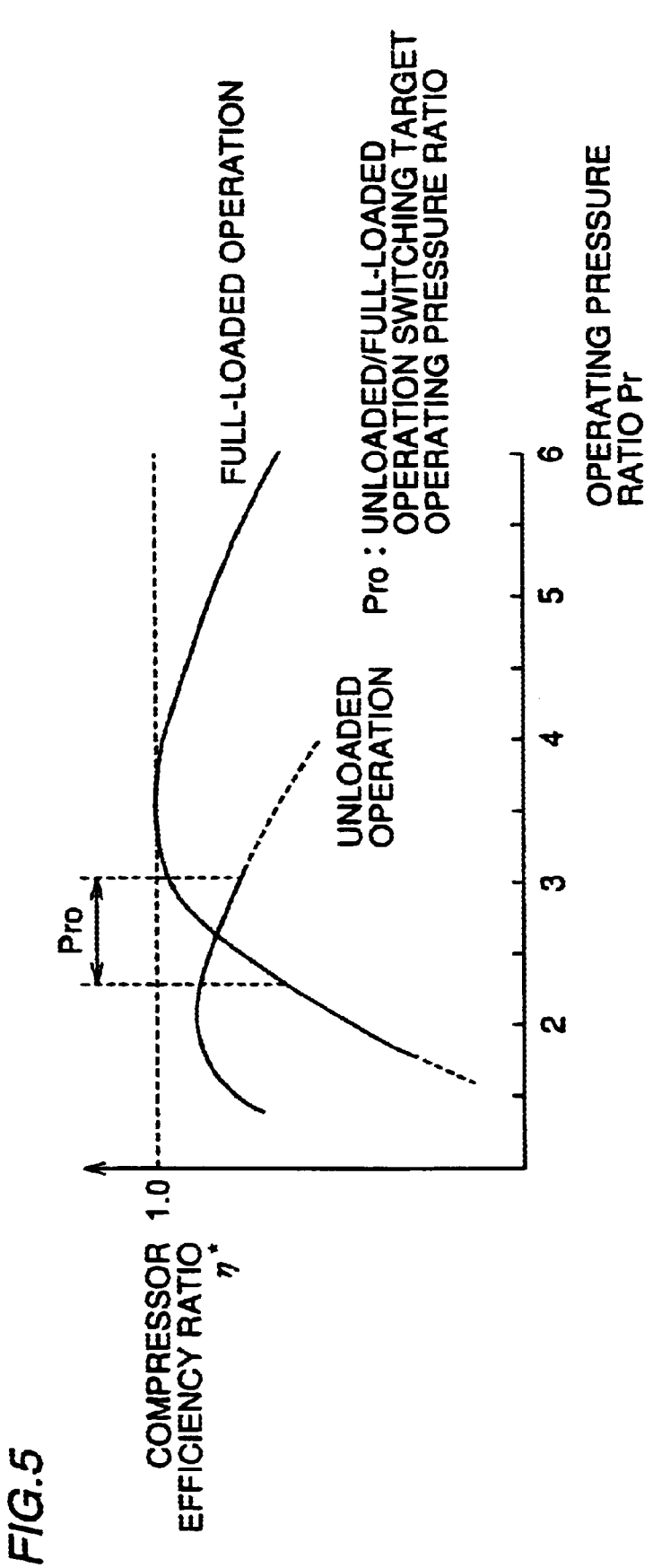
FIG. 5 illustrates the relation between a compressor efficiency ratio and the operating pressure ratio.

FIG. 4 shows exemplary relation between the operating pressure ratio Pr, the condensing temperature Tc and the evaporating temperature Te. Referring to FIG. 4, the refrigerant is prepared from R22 (CHCIF2). FIG. 5 shows the relation between an efficiency ratio η* of the scroll compressor and the operating pressure ratio Pr. The aforementioned efficiency ratio η* indicates an efficiency ratio with reference to a pressure ratio maximizing efficiency in full-loaded operation.

It is understood from FIG. 4 that the operating pressure ratio Pr varies with the combination of the condensing temperature Tc and the evaporating temperature Te. It is also understood from FIG. 5 that whether full-loaded operation or unloaded operation is optimum depends on the operating pressure ratio Pr. This is because the optimum pressure ratio depends on the winding angles of the scrolls 1 and 2, the position of the discharge port 19 and the ratio of the volume of the compression chambers 40 for starting compression to that for starting communicating with the discharge port 19.

Thus, it is understood that full-loaded operation and unloaded operation are preferably switched in response to the value of the operating pressure ratio Pr in order to keep high efficiency of the scroll compressor.

Referring to FIGS. 4 and 5, an unloaded/full-load operation switching target operating pressure ratio Pro forming the standard for switching unloaded operation and full-loaded operation may be set to 2.2 to 3. This pressure ratio Pro, conceivably varying with the type of the used refrigerant and the application of a refrigerator/air conditioner, is previously obtained in response to the type of the used refrigerant and the application.

The control part 26 compares the pressure ratio Pr calculated in operation of the scroll compressor with the aforementioned pressure ratio Pro for selecting full-loaded operation in principle when the pressure ratio Pr is greater than the pressure ratio Pro while selecting unloaded operation in principle when the pressure ratio Pr is less than the pressure ratio Pro. Alternatively, unloaded operation may be selected when it is predicted from the indoor temperature, the condensing temperature Tc and the evaporating temperature Te varying from hour to hour that the pressure ratio Pr lowers below the pressure ratio Pro before long.

Thus, over-compression loss can be reduced under low operating pressure ratio conditions and counterflow loss can be reduced under high operating pressure ratio conditions as shown in FIGS. 6A to 7C.

The unloaded operation valve 12 is kept closed in order to perform full-loaded operation, while the control part 26 opens the unloaded operation valve 12 in order to perform unloaded operation.

However, it may be rather advantageous to select unloaded operation also when the pressure ratio Pr is greater than the pressure ratio Pro. More specifically, unloaded operation is preferably selected when the evaporating temperature Te is low, the condensing temperature Tc is high (the operating pressure ratio Pr is high) and the required ability is small, for example.

In this case, the aforementioned required ability detection part detects the required ability on the basis of temperature conditions etc. in operation of the scroll compressor, and hence the control part 26 intentionally opens the unloaded operation valve 12 on the basis of the result of this detection. Thus, it is possible to avoid full-loaded low-speed operation causing difficulty in lubrication and improve reliability of the scroll compressor.

Also in the case of selecting unloaded operation when the operating pressure ratio Pr is high, the required ability can be attained by properly adjusting the rotational frequency of the motor 28 by the control part 26.

Figure 6A:
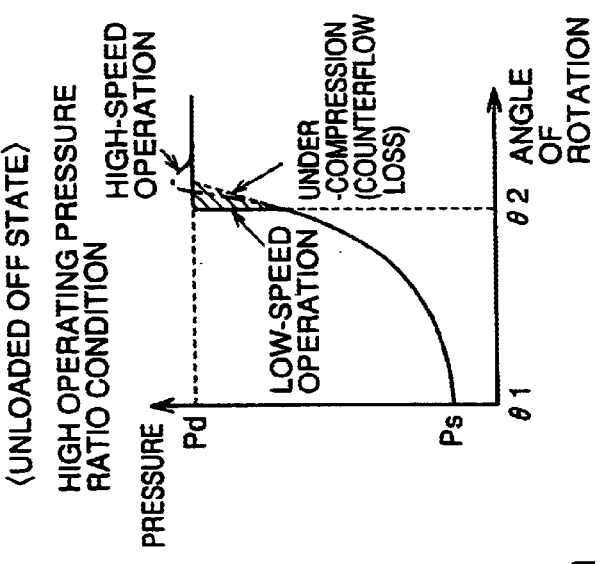
FIG. 6A illustrates the relation between pressure change of a refrigerant and an angle of rotation of a movable scroll under a low operating pressure ratio condition in an unloaded OFF state.
Figure 6B:
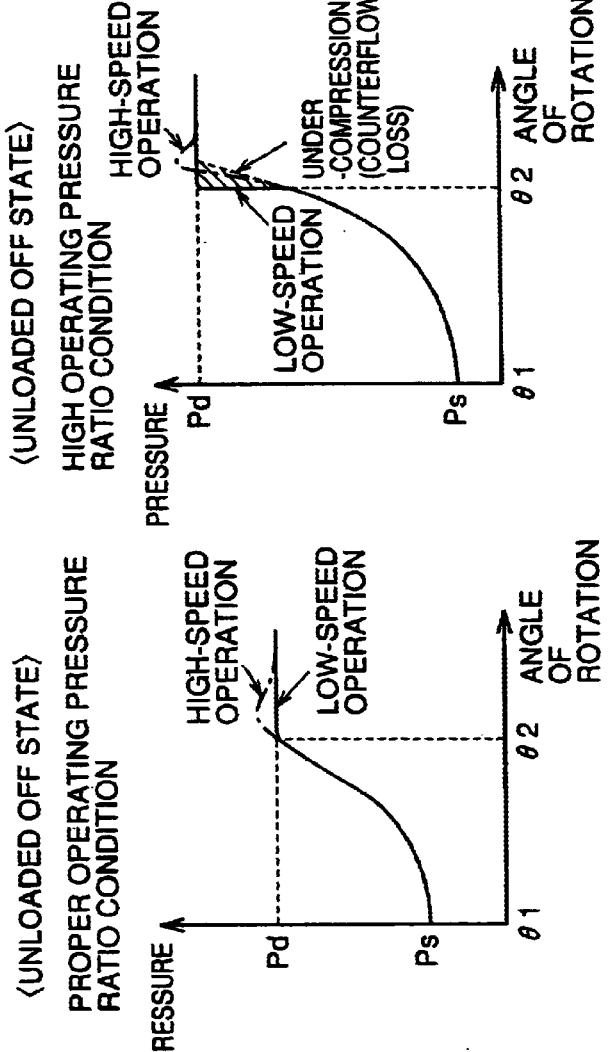
FIG. 6B illustrates the relation between pressure change of the refrigerant and the angle of rotation of the movable scroll under a general operating pressure ratio condition in the unloaded OFF state.
Figure 6C:
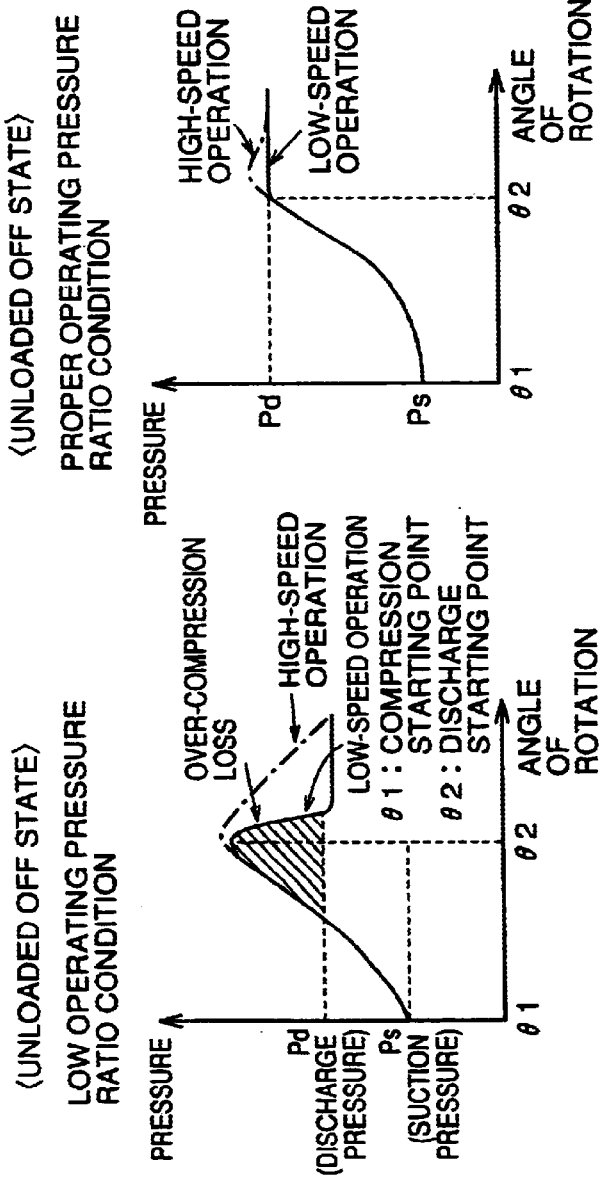
FIG. 6C illustrates the relation between pressure change of the refrigerant and the angle of rotation of the movable scroll under a high operating pressure ratio condition in the unloaded OFF state.
Figure 7A:
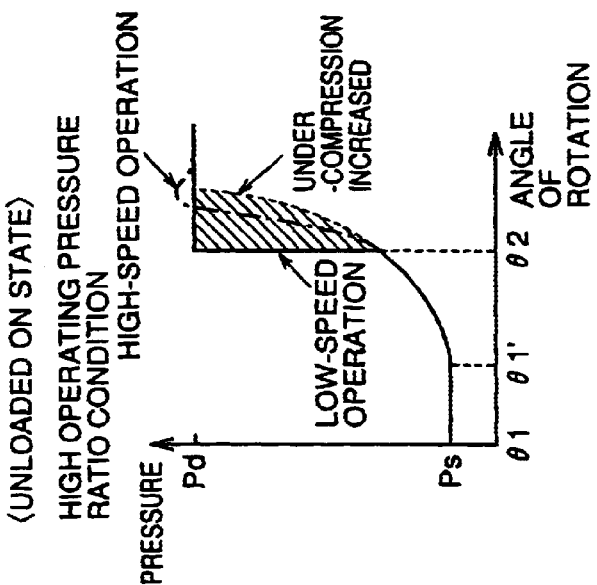
FIG. 7A illustrates the relation between pressure change of the refrigerant and the angle of rotation of the movable scroll under a low operating pressure ratio condition in an unloaded ON state.
Figure 7B:
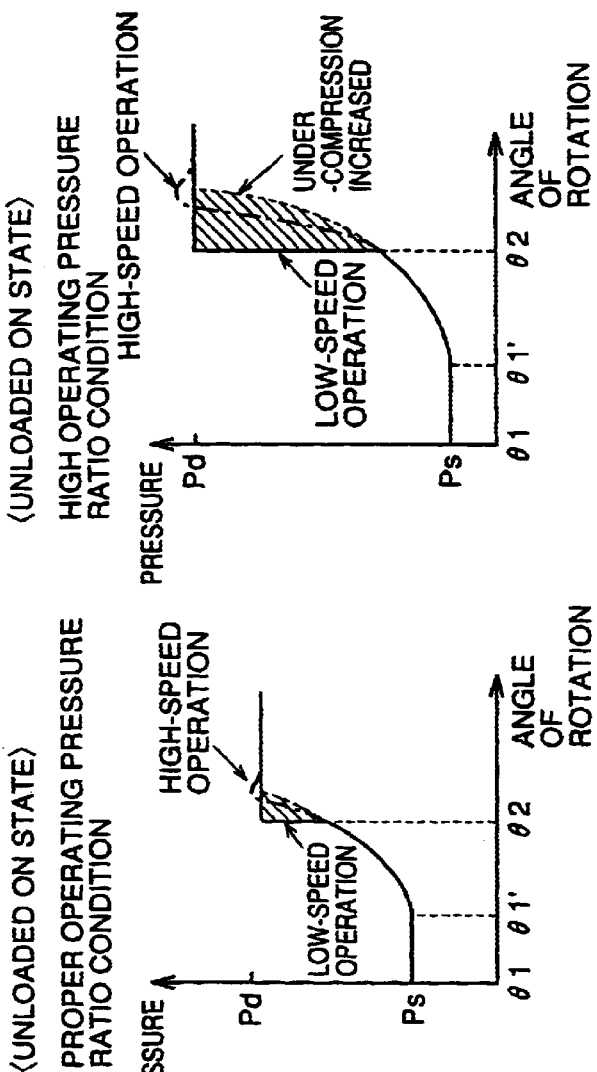
FIG. 7B illustrates the relation between pressure change of the refrigerant and the angle of rotation of the movable scroll under a general operating pressure ratio condition in the unloaded ON state.
Figure 7C:
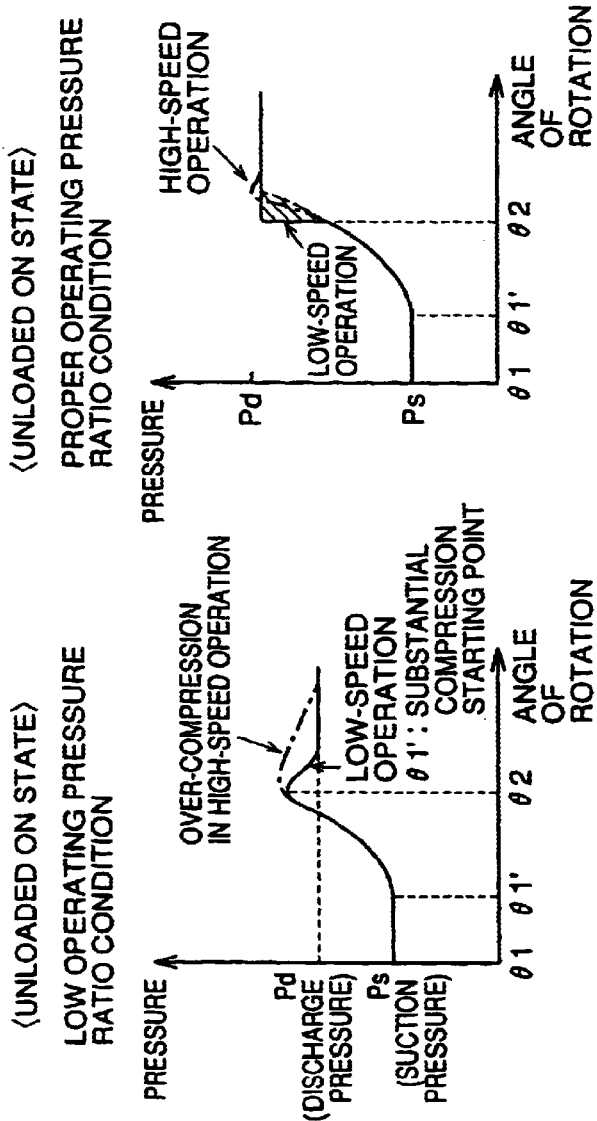
FIG. 7C illustrates the relation between pressure change of the refrigerant and the angle of rotation of the movable scroll under a high operating pressure ratio condition in the unloaded ON state.

In the case of performing unloaded operation when the operating pressure ratio Pr is high, however, under-compression (counterflow loss) increases as compared with the case of full-loaded operation, as shown in FIGS. 6C and 7C.

Figure 8:
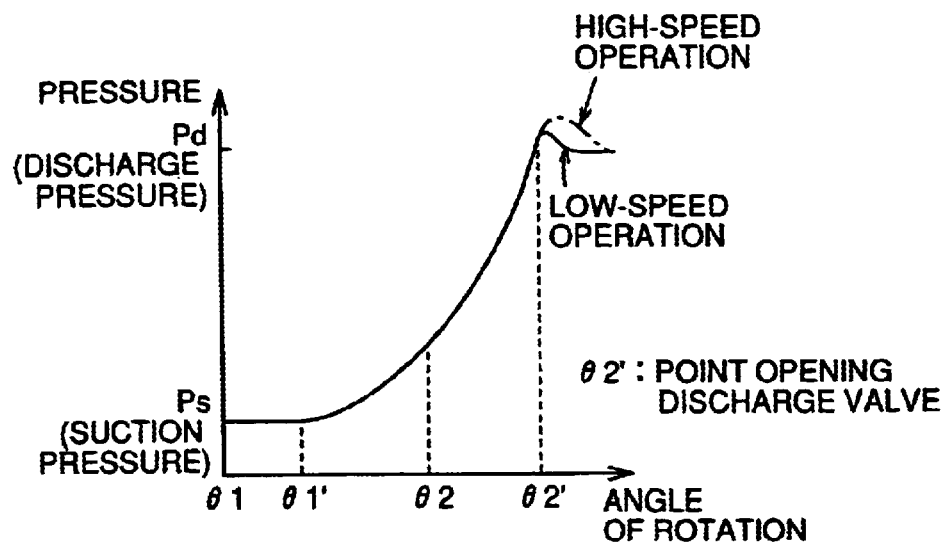
FIG. 8 illustrates the relation between pressure change of the refrigerant and the angle of rotation of the movable scroll under the high operating pressure ratio condition in the unloaded ON state provided with a discharge valve.

Such counterflow loss can be reduced by providing the discharge valve 20 as shown in FIG. 1 thereby preventing the refrigerant from counterflow in unloaded operation (see FIG. 8). Consequently, efficiency in low-speed operation can be improved.

Figure 9:
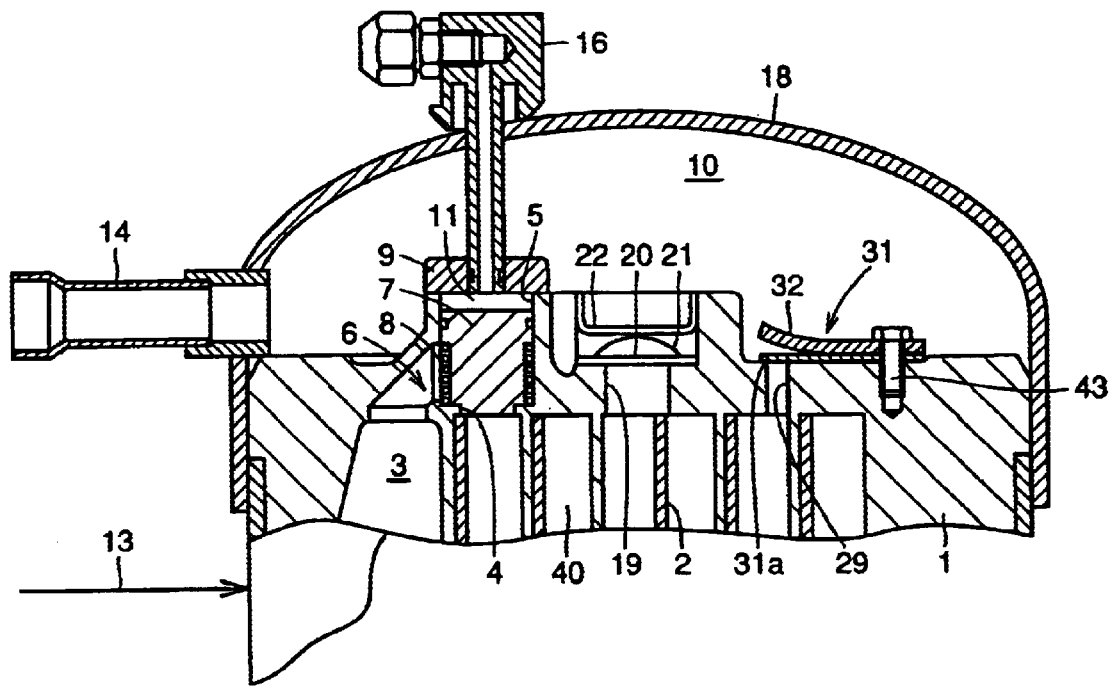
FIG. 9 is a partially fragmented sectional view of the scroll compressor illustrated with a relief port and a relief valve.

FIG. 9 is a sectional view of the scroll compressor illustrated with a relief valve mechanism 31. As shown in FIG. 9, the scroll compressor is provided with the relief port 29 communicating with the compression chamber 40 reaching the discharge pressure and a relief valve 31a opening/closing the relief port 29. A valve guard 32 is provided on the relief valve 3a, and the relief valve 31a as well as the valve guard 32 are mounted on the fixed scroll 1 with a bolt 43.

Figure 10:
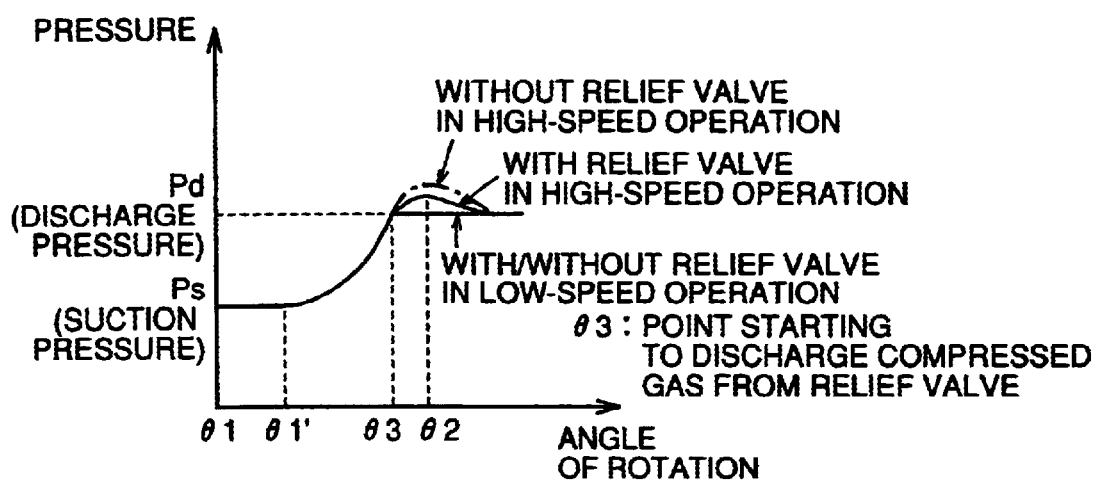
FIG. 10 illustrates the relation between pressure change of the refrigerant and the angle of rotation of the movable scroll under a general operating pressure ratio condition in the unloaded ON state provided with and not provided with the relief valve.

When the relief valve 31a is provided in the aforementioned manner, the refrigerant reaching the discharge pressure can be discharged into the discharge dome 10 through the relief port 29 upon high-speed operation in an unload state, for example, thereby reducing over-compression loss as shown in FIGS. 7A and 10. This also can effectively contribute to improvement of the efficiency of the scroll compressor.

Figure 11:
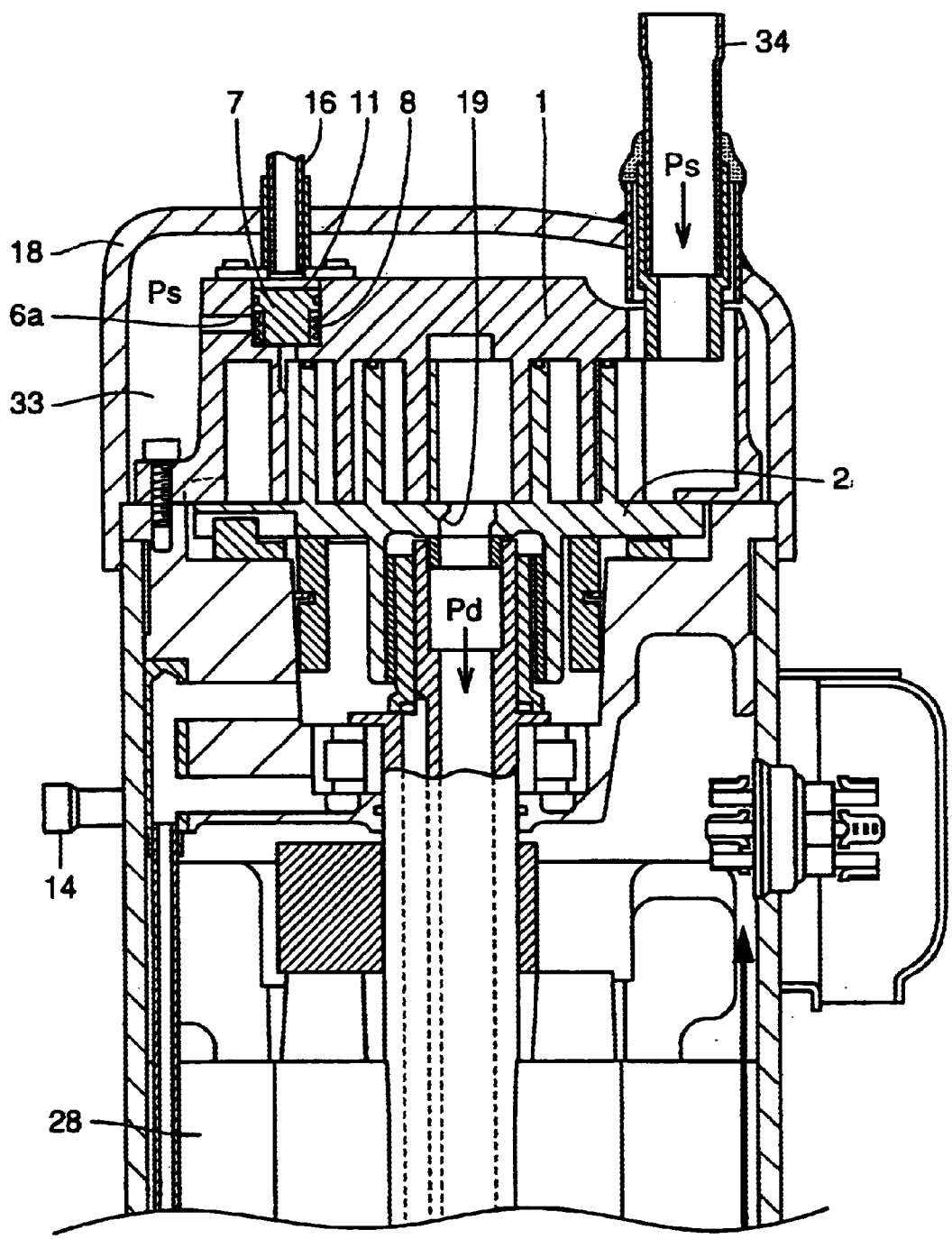
FIG. 11 is a partially fragmented sectional view of the scroll compressor employing a back space of a fixed scroll as a low-pressure (suction pressure) space.

As shown in FIG. 11, a suction pressure space 33 is preferably provided on the back surface of the fixed scroll 1. Thus, the refrigerant can be released into the suction pressure space 33 through the bypass path 6a in unloaded operation, and no detour may be provided for releasing the refrigerant into a low-pressure space but the unloading mechanism can be simplified.

Figure 12:
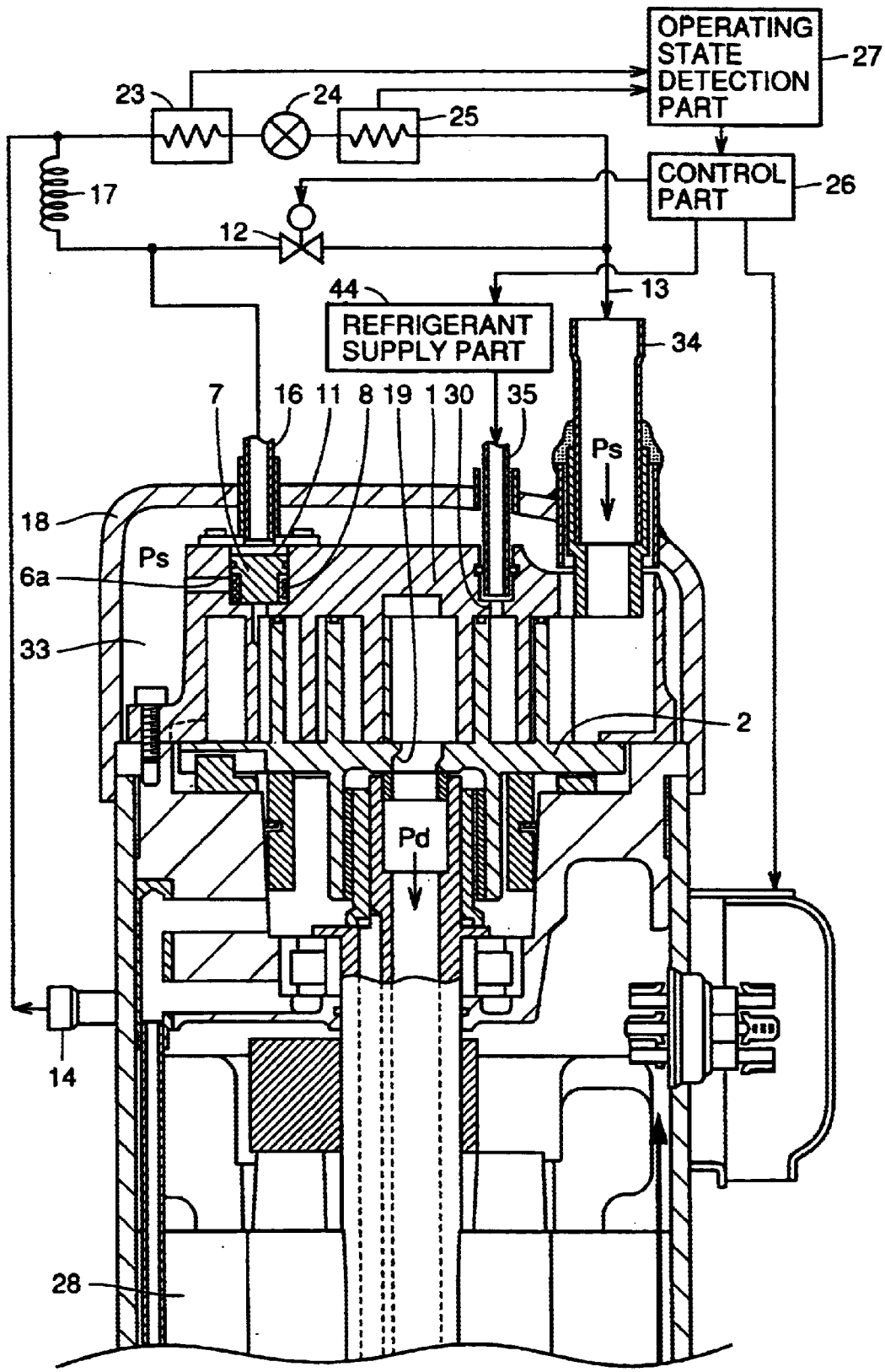
FIG. 12 is a schematic block diagram of the scroll compressor comprising an unloading mechanism and a refrigerant injection mechanism.

FIG. 12 is a schematic block diagram of the scroll compressor having the aforementioned structure, to which a refrigerant injection mechanism is further added.

As shown in FIG. 12, the scroll compressor comprises an injection port 30 for injecting the refrigerant into the compression chamber 40, an injection pipe 35 for guiding the refrigerant to the injection port 30 and a refrigerant supply part 44 supplying the refrigerant to the injection pipe 35.

When the scroll compressor comprises the refrigerant injection mechanism in the aforementioned manner, the variable ability width can be further increased than the above case. If required ability cannot be attained by rotating the motor 28 at a high speed in full-loaded operation, the control part 26 can drive the refrigerant supply part 44 for supplying the gas refrigerant into the compression chamber 40. Thus, the ability of the scroll compressor can be improved.

When injecting the refrigerant, the control part 26 keeps the unloaded operation valve 12 closed. Thus, the injected refrigerant can be inhibited from leaking into a suction compression chamber.

The operating state detection part 27 is set to also detect the temperature of the discharged refrigerant from the temperature of the discharge pipe 14. When the temperature of the refrigerant is excessively increased, the control part 26 can drive the refrigerant supply part 44 for supplying the liquid refrigerant into the compression chamber 40. Thus, not only reduction of the life of the refrigerant or lubricating oil can be suppressed but also operation stoppage of the apparatus resulting from increase of the temperature of the refrigerant can be avoided.

While the scroll compressor according to the present invention has been described, the inventive scroll compressor may simply comprise at least either the refrigerant injection mechanism for supplying the refrigerant into the compression chamber 40 or the unloading mechanism extracting the refrigerant from the compression chamber 40 toward the low-pressure side as capacity control means of the scroll compressor.

Figure 13:
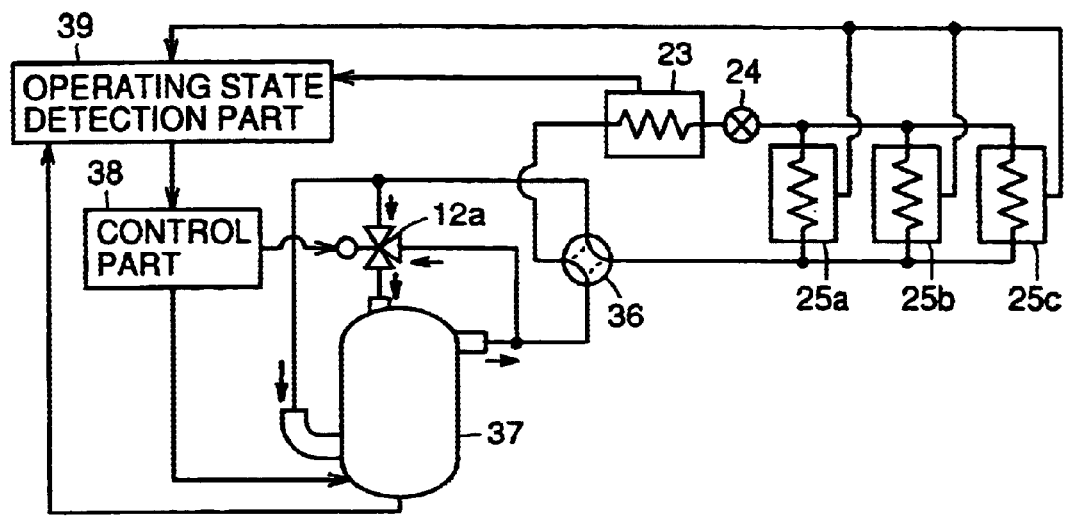
FIG. 13 is a schematic block diagram of an air conditioner according to the present invention.

An air conditioner according to the present invention is now described with reference to FIGS. 13 to 16. FIG. 13 schematically illustrates the structure of the air conditioner according to the present invention.

The air conditioner shown in FIG. 13 is the so-called multiple air conditioner, and comprises a plurality of loading-side heat exchangers. More specifically, the air conditioner comprises a condenser 23, an expansion valve 24, evaporators 25a to 25c serving as the loading-side heat exchangers, a compressor 37, an unloaded operation valve 12a, a four-way switching valve 36, an operating state detection part 39 and a control part 38.

The compressor 37, which may be a variable capacity compressor, is preferably a scroll compressor. The compressor 37 has a compression element compressing a refrigerant, a variable-speed motor driving the compression element and an unloading mechanism serving as capacity control means. A refrigerant injection mechanism may be provided as the capacity control means, similarly to the case of the aforementioned scroll compressor.

The operating state detection part 39 detects the operating state of the air conditioner. Similarly to the case of the aforementioned scroll compressor, this operating state detection part 39 includes an operating pressure ratio detection part detecting an operating pressure ratio of a discharge pressure for a refrigerant to a suction pressure for the refrigerant in the compressor 37, a required ability detection part detecting required ability of the evaporators 25a to 25c in operation of the air conditioner, and a number detection part detecting the number of operated ones of the evaporators 25a to 25c. The operating pressure ratio and the required ability are detected similarly to the case of the aforementioned scroll compressor.

The control part 38 controls operation of the unloading mechanism and the rotational frequency of a motor in response to the operating pressure ratio, the required ability and the number of the operated ones of the evaporators 25a to 25c.

When the air conditioner comprises the operating state detection part 39 and the control part 38 as described above, the operation of the unloading mechanism and the rotational frequency of the motor can be controlled on the basis of the result of detection of the operating state of the air conditioner.

Thus, when the difference between the evaporating temperature of the refrigerant in the evaporators 25a to 26c and the condensing temperature of the refrigerant in the condenser 23 is small and large ability is required, for example, the control part 38 opens the unloaded operation valve 12a for performing unloaded operation while rotating the motor at a high speed. Thus, over-compression loss can be reduced.

When the aforementioned temperature difference is small and the ability may be small, the control part 38 closes the unloaded operation valve 12a for performing full-loaded operation while rotating the motor at a low speed. Thus, counterflow loss can be reduced.

Figure 14:
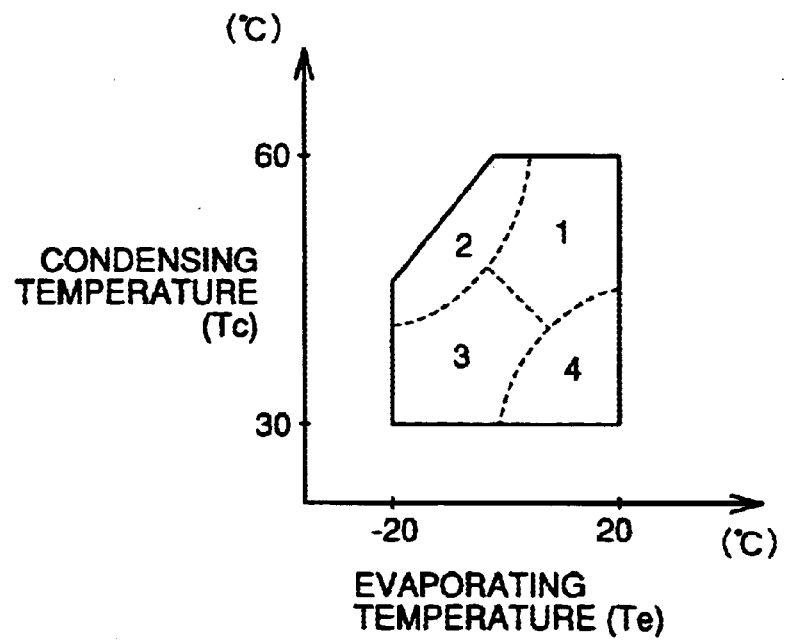
FIG. 14 illustrates the relation between a condensing temperature and an evaporating temperature.

Thus, high-efficiency operation can be performed also under conditions shown by regions 2 and 4 in FIG. 14.

When the air conditioner comprises a refrigerant injection mechanism (not shown) as the capacity control means of the compressor, the control part 38 can operate the refrigerant injection mechanism for injecting a gas refrigerant and rotating the motor at a high speed in heating operation with a low outside air temperature and a low evaporating temperature, for example. In this case, the quantity of discharged refrigerant can be increased without extremely increasing the rotational frequency of the motor, and reliability of the compressor can be improved.

When adiabatic efficiency of the compressor is reduced and the temperature of the discharged refrigerant is increased in low-speed operation of the compressor, the temperature of the discharged refrigerant can be reduced by operating the refrigerant injection mechanism for injecting a liquid refrigerant. Thus, not only reduction of the life of the refrigerant or lubricating oil can be suppressed but also operation of the air conditioner may not be stopped due to an increased temperature of the discharged refrigerant.

In the multiple air conditioner shown in FIG. 13, the number of the operated loading-side heat exchangers also influences the required ability, in addition to the relation between the evaporating temperature and the condensing temperature. When the air conditioner is provided with the number detection part as described above, the operation of the unloading mechanism and the rotational frequency of the motor can be controlled also in consideration of the number of the operated loading-side heat exchangers.

Thus, high-efficiency operation can be performed also when the temperature difference between the evaporating temperature and the condensing temperature is small and all evaporators 25a to 25c are operated or the temperature difference is large and the evaporators 25a to 25c are partially operated, for example.

The compressor 37 may be provided with a discharge valve and a relief valve, similarly to the case of the aforementioned scroll compressor.

Figure 15:
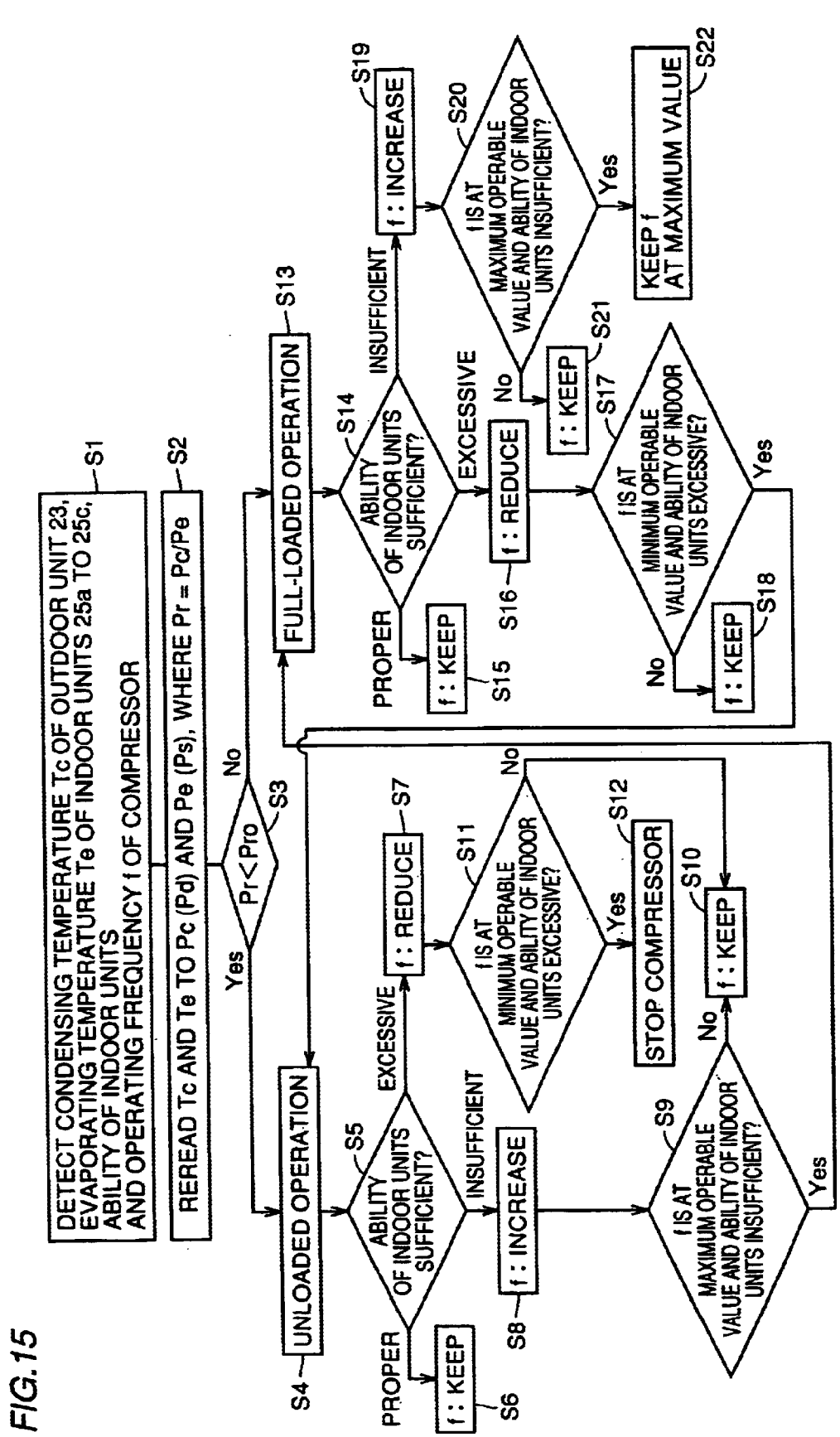
FIG. 15 is a flow chart for illustrating exemplary operation of the air conditioner shown in FIG. 13.
Figure 16:
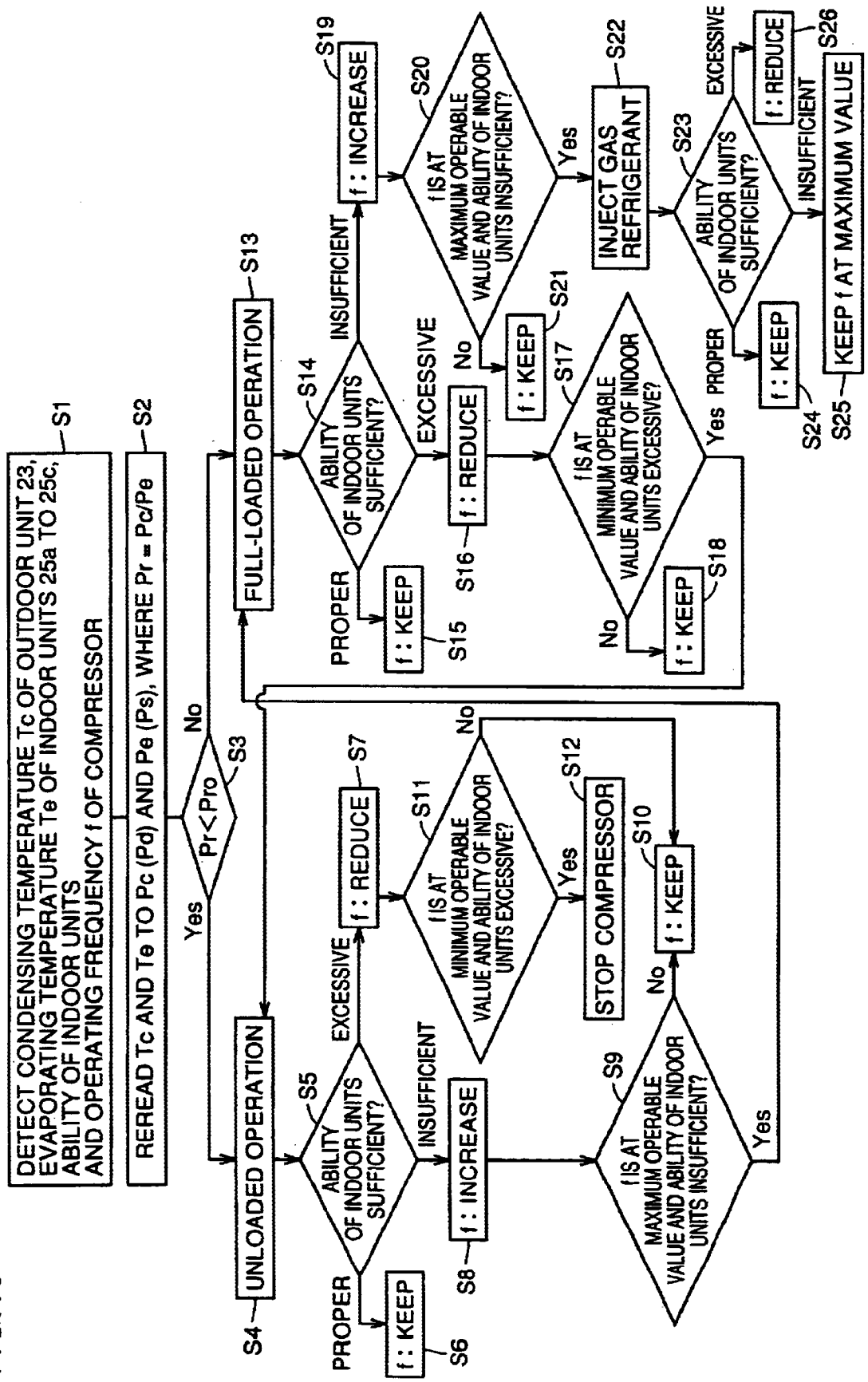
FIG. 16 is a flow chart for illustrating exemplary operation of the air conditioner shown in FIG. 13 having a refrigerant injection mechanism added thereto.
Figure 17:
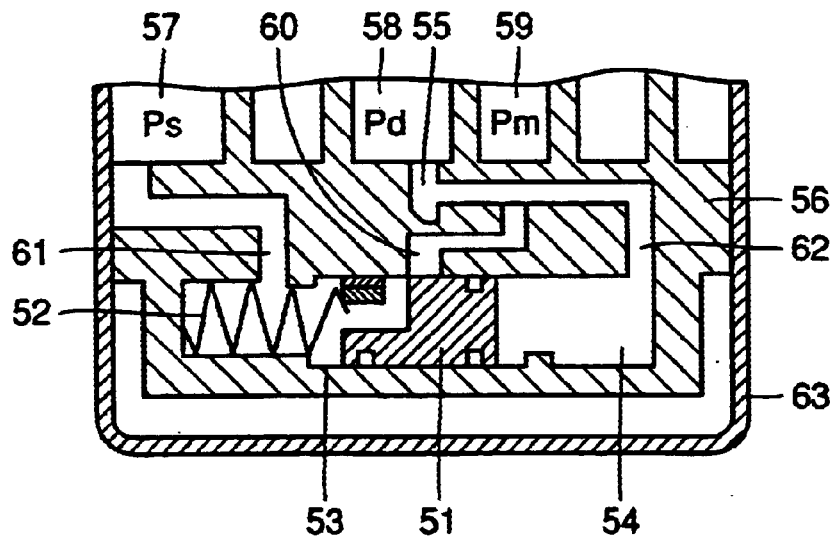
FIG. 17 is a partially fragmented sectional view of a conventional refrigerant compressor.
Figure 18:
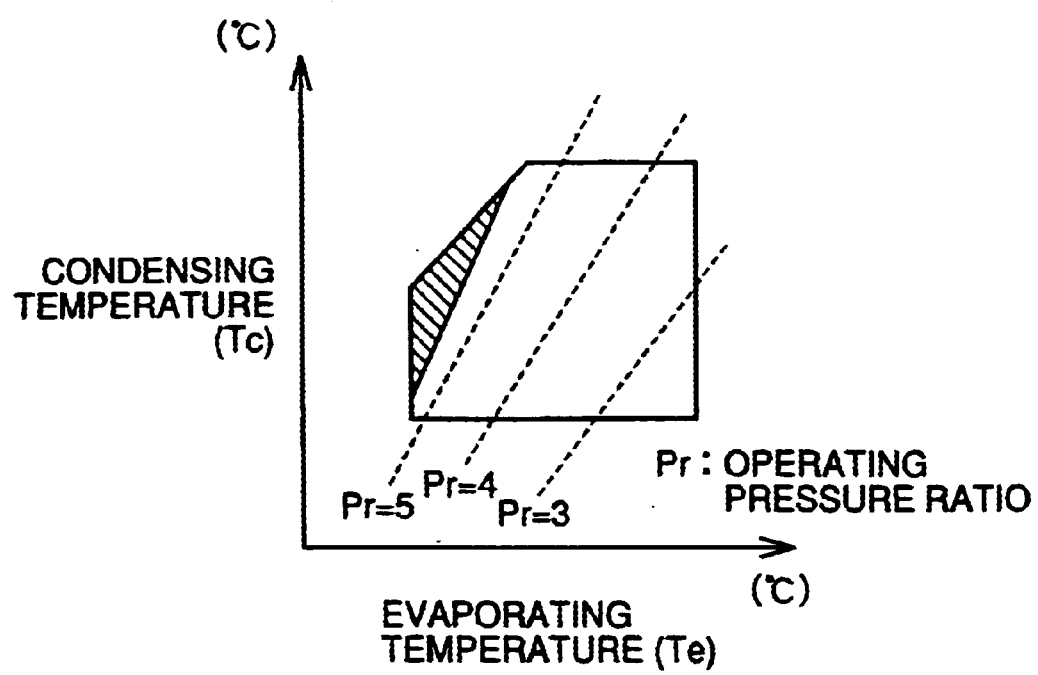
FIG. 18 illustrates the relation between operating temperature conditions (condensing temperature and evaporating temperature) and an operating pressure ratio.

Exemplary operation of the air conditioner according to the present invention is now described with reference to FIGS. 15 and 16. FIG. 15 is a flow chart for illustrating exemplary operation (cooling operation) of the air conditioner shown in FIG. 13. FIG. 16 is a flow chart for illustrating exemplary operation of the air conditioner shown in FIG. 13, to which the refrigerant injection mechanism is added.

Referring to FIG. 15, the operating state detection part 39 detects the condensing temperature Tc in the condenser (outdoor unit) 23 and the evaporating temperature Te in the evaporators (indoor units) 25a to 25c. At this time, the operating state detection part 39 also detects the operating frequency f of the compressor 37 and the current ability of each indoor unit.

At a step S2, the operating state detection part 39 obtains a refrigerant condensing pressure Pc (substantially equal to a discharge pressure Pd) and a refrigerant evaporating pressure Pe (substantially equal to a suction pressure Ps) from the condensing temperature Tc and the evaporating temperature Te, thereby calculating an operating pressure ratio Pr (Pc/Pe).

At a step S3, the control part 38 compares the aforementioned operating pressure ratio Pr with an unloaded operation/full-loaded operation switching target operating pressure ratio Pro previously input as data.

When the pressure ratio Pr is less than the pressure ratio Pro, the control part 38 opens the unloaded operation valve 12a at a step S4, for performing unloaded operation.

At a step S5, the operating state detection part 39 detects whether or not the ability of the evaporators (indoor units)

25a to 25c is sufficient in the aforementioned unloaded operation. The operating frequency f of the compressor 37 is kept as such at a step S7 if the ability is proper, while the control part 38 increases the aforementioned operating frequency f at a step S8 if the ability is insufficient, or reduces the aforementioned operating frequency f at a step S7 if the ability is excessive.

After increasing the operating frequency f at the step S8, the operating state detection part 39 determines whether or not the operating frequency f is at the maximum operable value and the ability of the evaporators (indoor units) 25a to 25c is insufficient at a step S9. If the ability is insufficient, the control part 38 closes the unloaded operation valve 12a at a step S13 for performing full-loaded operation. If the ability is sufficient, the aforementioned operating frequency f is kept as such at a step S10.

After reducing the aforementioned operating frequency f at the step S7, the operating state detection part 39 determines whether or not the operating frequency f is at the minimum operable value and the ability of the evaporators (indoor units) 25a to 25c is excessive at a step S11. The control part 38 stops the compressor 37 at a step S12 if the ability is excessive, while the aforementioned operating frequency f is kept as such at the step S10 if the ability is not excessive.

If the pressure ratio Pr is in excess of the pressure ratio Pro at the step S3, the process advances to a step S13 so that the control part 38 keeps the unloaded operation valve 12a closed for performing full-loaded operation.

After performing full-loaded operation in the aforementioned manner, the operating state detection part 39 determines whether or not the ability of the evaporators (indoor units) 25a to 25c is sufficient at a step S14. The operating frequency f of the compressor 37 is kept as such at a step S15 if the ability is proper, while the control part 38 increases the aforementioned operating frequency f at a step S19 if the ability is insufficient, or reduces the aforementioned operating frequency f at a step S16 if the ability is excessive.

After reducing the operating frequency f at the step S16, the operating state detection part 39 determines whether or not the operating frequency f is at the minimum operable value and the ability of the evaporators (indoor units) 25a to 25c is excessive at a step S17. The process returns to the step S4 if the ability is excessive so that the control part 38 opens the unloaded operation valve 12a for performing unloaded operation, while the aforementioned operating frequency f is kept as such at a step S18 if the ability is not excessive.

After increasing the operating frequency f at the step S19, the operating state detection part 39 determines whether or not the operating frequency f is at the maximum operable value and the ability of the evaporators (indoor units) 25a to 25c is insufficient at a step S20. The operating frequency f of the compressor 37 is kept at the maximum value at a step S22 if the ability is insufficient, while the aforementioned operating frequency f is kept at a step S21 if the ability is not insufficient.

When adjusting the ability, unloaded operation and full-loaded operation may be frequently switched to result in a possibility of abnormal vibration. Such hunting can be prevented by increasing an ability change ratio Qmax/Qmin of minimum operating frequency ability Qmin to maximum operating frequency ability Qmax under a full-loaded (or unloaded) state beyond an ability change ratio Qf/Qu of unloaded operation ability Qu to full-loaded operation ability Qf at the same operating frequency.

Exemplary operation of the air conditioner provided with the refrigerant injection mechanism is now described.

Referring to FIG. 16, operation up to a step S21 is similar to that described above and hence redundant description is not repeated. When the operating frequency f is at the maximum operable value and the ability of the evaporators (indoor units) 25a to 25c is insufficient at a step S20, the control part 38 operates the refrigerant injection mechanism at a step S22 for injecting the gas refrigerant into the compression element in the compressor 37.

After the aforementioned injection, the operating state detection part 39 determines whether or not the ability of the evaporators (indoor units) 25a to 25c is sufficient at a step S23. The operating frequency f of the compressor 37 is kept as such at a step S24 if the ability is proper, the aforementioned operating frequency is kept at the maximum value at a step S25 if the ability is insufficient, while the control part 38 reduces the aforementioned operating frequency f at a step S26 if the ability is excessive.

The air conditioner can be efficiently operated in every operating state due to the aforementioned operation control.

The air conditioner shown in FIG. 13, comprising a single compressor, may alternatively comprise a plurality of compressors. When the air conditioner comprises a plurality of compressors, an inverter compressor provided with the aforementioned capacity control mechanism may be combined with another type of compressor (a compressor provided with a constant speed capacity control mechanism or a compressor provided with a constant speed-constant capacity compressor, for example).

According to the present invention, as hereinabove described, a scroll compressor and an air conditioner capable of performing high-efficiency operation in every operating state and having a large variable ability width as well as high reliability can be obtained. The air conditioner can be inhibited from a complicated system connecting a number of miniature compressors in parallel with each other, and the cost can be reduced.

The present invention is effectively applicable to a scroll compressor and an air conditioner.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A scroll compressor having a movable scroll and a fixed scroll forming a compression chamber compressing a refrigerant, said scroll compressor comprising:

a variable-speed motor driving said movable scroll;

capacity control means controlling the capacity of said scroll compressor by supplying said refrigerant into said compression chamber or bypassing said refrigerant from said compression chamber to a low-pressure side;

an operating state detection part detecting the operating state of said scroll compressor; and a control part controlling operation of said capacity control means and the rotational frequency of said motor;

wherein said operating state detection part includes an operating pressure ratio detection part detecting an operating pressure ratio indicating the value of the ratio of a suction pressure for said refrigerant to a discharge pressure for said refrigerant and a required ability detection part detecting required ability in operation of said scroll compressor, and wherein said control part controls operation of said capacity control means and the rotational frequency of said motor in response to said operating pressure ratio and said required ability.

2. The scroll compressor according to claim 1, wherein said capacity control means includes unloading means for delaying a compression starting point in said compression chamber and performing unloaded operation.

3. The scroll compressor according to claim 1, wherein said capacity control means includes refrigerant injection means for injecting said refrigerant into said compression chamber.

4. The scroll compressor according to claim 1, further comprising:

a discharge port discharging compressed said refrigerant, and a discharge valve for opening/closing said discharge port and preventing said refrigerant from counterflow.

5. The scroll compressor according to claim 1, further comprising:

a relief port communicating with said compression chamber reaching a discharge pressure, and a relief valve opening/closing said relief port.

6. The scroll compressor according to claim 1, wherein said movable scroll and said fixed scroll have spiral bodies, and the tail end of one said spiral body extends toward a portion close to the tail end of the other said spiral body.

7. The scroll compressor according to claim 2, comprising a suction pressure space on the back surface of said fixed scroll.

8. An air conditioner comprising the scroll compressor according to claim 1.

9. An air conditioner including a compressor having a compression element compressing a refrigerant and a plurality of loading-side heat exchangers condensing or evaporating said refrigerant, said air conditioner comprising:

a variable-speed motor driving said compression element;

capacity control means supplying said refrigerant to said compression element or extracting said refrigerant from said compression element thereby controlling the capacity of said compressor;

an operating state detection part detecting the operating state of said air conditioner; and a control part controlling operation of said capacity control means and the rotational frequency of said motor;

wherein said operating state detection part includes an operating pressure ratio detection part detecting an operating pressure ratio indicating the value of the ratio of a suction pressure for said refrigerant to a discharge pressure for said refrigerant in said compressor and a required ability detection part detecting required ability of said loading-side heat exchangers in operation of said air conditioner, and wherein said control part controls operation of said capacity control means and the rotational frequency of said motor in response to said operating pressure ratio and said required ability.

10. The air conditioner according to claim 9, wherein said operating state detection part further includes a number detection part detecting the number of operated said loading-side heat exchangers, for controlling operation of said capacity control means and the rotational frequency of said motor also in consideration of the number of said operated loading-side heat exchangers.

* * * * *